United States Patent
Song et al.

(10) Patent No.: US 7,566,410 B2
(45) Date of Patent: Jul. 28, 2009

(54) HIGHLY CONDUCTIVE NANO-SCALED GRAPHENE PLATE NANOCOMPOSITES

(75) Inventors: Lulu Song, Centerville, OH (US); Jiusheng Guo, Centerville, OH (US); Aruna Zhamu, Centerville, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 364 days.

(21) Appl. No.: 11/328,880

(22) Filed: Jan. 11, 2006

(65) Prior Publication Data

US 2007/0158618 A1 Jul. 12, 2007

(51) Int. Cl.
H01B 1/00 (2006.01)
H01B 1/20 (2006.01)

(52) U.S. Cl. ............... 252/511; 252/500; 252/502; 252/510; 977/700; 977/755; 977/773; 977/778; 977/783; 524/496; 423/448

(58) Field of Classification Search ............ 252/500, 252/502, 510, 511; 977/700, 755, 773, 778, 977/783; 524/496; 423/448
See application file for complete search history.

(56) References Cited

U.S. PATENT DOCUMENTS

| | | | |
|---|---|---|---|
| 4,199,628 A | 4/1980 | Caines | |
| 4,530,949 A | 7/1985 | Atkinson et al. | |
| 4,704,231 A | 11/1987 | Chung | |
| 4,946,892 A | 8/1990 | Chung | |
| 4,987,175 A | 1/1991 | Bunnell, Sr. | |
| 5,019,446 A | 5/1991 | Bunnell, Sr. | |
| 5,186,919 A | 2/1993 | Bunnell, Sr. | |
| 5,582,781 A | 12/1996 | Hayward | |
| 7,071,258 B1* | 7/2006 | Jang et al. | 524/496 |
| 2004/0127621 A1* | 7/2004 | Drzal et al. | 524/424 |
| 2007/0092432 A1* | 4/2007 | Prud'Homme et al. | 423/448 |
| 2007/0131915 A1* | 6/2007 | Stankovich et al. | 252/511 |
| 2007/0142547 A1* | 6/2007 | Vaidya et al. | 524/847 |

OTHER PUBLICATIONS

Wong et al. Graphene nanoplatelet reinforced polymer coatings. Annual Technical Conference—Society of Plastics Engineers. vol. 62, pp. 1733-1737, 2004.*

P. Xiao, L. Y. Sun, M. Xiao, and K. C. Gong, "Preparation and Properties of Polystyrene/Graphite Nanocomposite," Materials Res. Soc. Symposium, 661 (2001) KK5.3.1-KK5.3.6.

(Continued)

Primary Examiner—Mark Kopec
Assistant Examiner—Tri V Nguyen

(57) ABSTRACT

Disclosed is a nano-composite material comprising fully separated nano-scaled graphene platelets (NGPs) dispersed in a matrix material, wherein each of the platelets comprises a sheet of graphite plane or multiple sheets of graphite plane and has a thickness no greater than 100 nm and the platelets have an average length, width, or diameter no greater than 500 nm. The graphene plates are present in an amount no less than 15% by weight based on the total weight of the platelets and the matrix material combined. Typically, the nanocomposite is electrically conductive with a bulk conductivity no less than 10 S/cm and more typically no less than 100 S/cm. Highly conductive NGP nanocomposites are particularly useful for fuel cell flow field plate (bipolar plate) and battery electrode applications. Nanocomposites with high NGP proportions can be used in automotive friction plates and aircraft brake components.

18 Claims, 9 Drawing Sheets

OTHER PUBLICATIONS

P. Xiao, M. Xiao, and K. C. Gong, "Preparation of Exfoliated Graphite/Polystyrene Composite by Polymerization-filling technique," Polymer, 42, 4813 (2001).

M. Xiao, L. Y. Sun, J. J. Liu, Y. Li, and K. C. Gong, "Synthesis and Properties of Polystrene/Graphite Nanocomposite," Polymer, 43-8 (2002) 2245.

H. Shioyama, "Review: The Interactions of Two Chemical Species in The Interlayer Spacing of Graphite," Synthetic Metals, 114 (2000) 1.

G. H. Chen, D. J. Wu, W. Weng, B. He, W. Yan. "Preparation of Polymer/Graphite Conducting Nanocomposites by Intercalation Polymerization," J. Appl. Polymer Sci., 82 (2001) 250.

G. H. Chen, C. Wu, W. Weng, D. Wu, and W. Yan, "Preparation of Polystyrene/Graphite Nano-sheet Composite," Polymer, 44 (2003) 1781-1784.

G. H. Chen, D. Wu, W. Weng, and C. Wu, "Exfoliation of Graphite Flake and Its Nanocomposites," Carbon, 41 (2003) 619-621.

G. H. Chen, W. Weng, D. Wu, and C. Wu, "PMMA/Graphite Nanosheet Composite and Its Conducting Properties," Euro. Polymer J., 39 (2003) 2329-2335.

G. H. Chen, W. Weng, D. Wu, C. Wu, J. Lu, P. Wang, X. Chen, "Preparation and Characterization of Graphite Nanosheets from Ultrasonic Powdering Technique," Carbon, 42 (2004) 75.

J. Zhu, F. M. Uhl, A. B. Morgan, and C. A. Wilkie, "Studies on the Mechanism by Which the Formation of Nanocomposites Enhances Thermal Stability," Chem. Mater., 13 (2001) 4649.

Y. X. Pan, Z. Yu, Y. Ou, and G. H. Hu, "A New Process of Fabricating Electrically Conducting Nylon6/Graphite Nanocomposites via Intercalation Polymerization," J. Polymer Sci., Mar. 2000.

W. Zheng, S. C. Wong, and H. J. Sue, "Transport behavior of PMMA/expanded graphite nanocomposites," Polymer, 73 (2002) 6767.

W. Zheng and S. C. Wong, "Electrical conductivity and dielectric properties of PMMA/expanded graphite composites," Composite Sci., and Tech., 63 (2003) 225.

J. W. Shen, X. M. Chen, and W. Y. Huang, "Structure and Electrical Properties of Grafted Polypropylene/Graphite Nanocomposites Prepared by Solution Intercalation", J. App. Pol, 2002.

W. P. Wang and C. Y. Pan, "Synthesis and Characterization of Poly-(ethylene Oxide) Methyl Ether Grafted on the Expanded Graphite with Isocyanate Groups," Euro. Polymer J., 40(,2004.

H. Fukushima and L. T. Drzal, "Graphite Nanoplatelets As Reinforcements for Polymers: Structural and Electrical Properties," Proc. Of the 17th Annual Conf. of the Am. Soc. For, 2003.

H. Fukushima, S. H. Lee, and L. T. Drzal, "Graphite Platelet/Nylon Nanocomposites," Proc. of SPE ANTEC (2004) 1441-1445.

A. Yasmin, J. J. Luo, and I. M. Daniel, "Processing of Graphite Nanosheet Reinforced Polymer Nanocomposites," Proc. of the 19th ASC/ASTM Joint Tech Conf., E. Armeiros, Ed., Ga, 2004.

A. Yasmin and I. M. Daniel, "Mechanical and thermal Properties of Graphite Platelet/Epoxy Composites," Polymer, 45 (2004) 8211-8219.

J. Mack, L. Viculis, A. Ali, R. Luoh, G. Yang, R. Kaner, T. Hahn, and F. Ko, "Graphite Nanoplatelet Based Nanocomposites by the Electrospinning Process," Proc. Of the 17th Ann.

\* cited by examiner

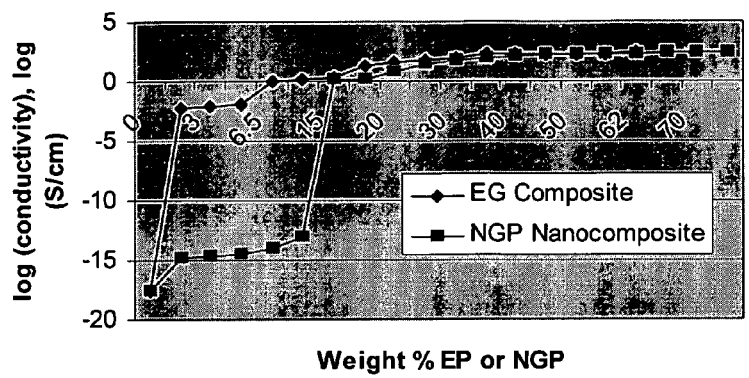
FIG.4(A) Log (conductivity) of EGF composite & NGP nanocomposite plates.
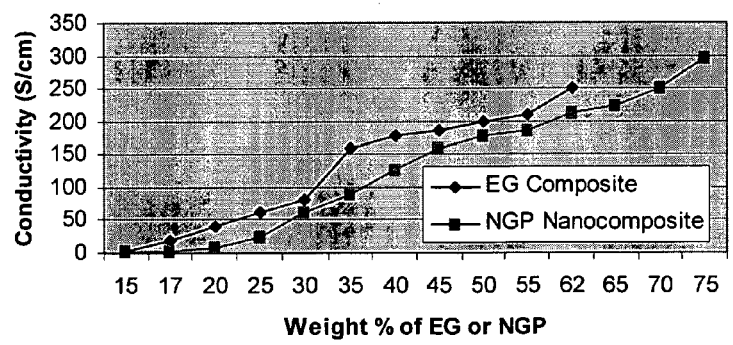
FIG.4(B) In-plane conductivity of EGF composite & NGP nanocomposite plates.

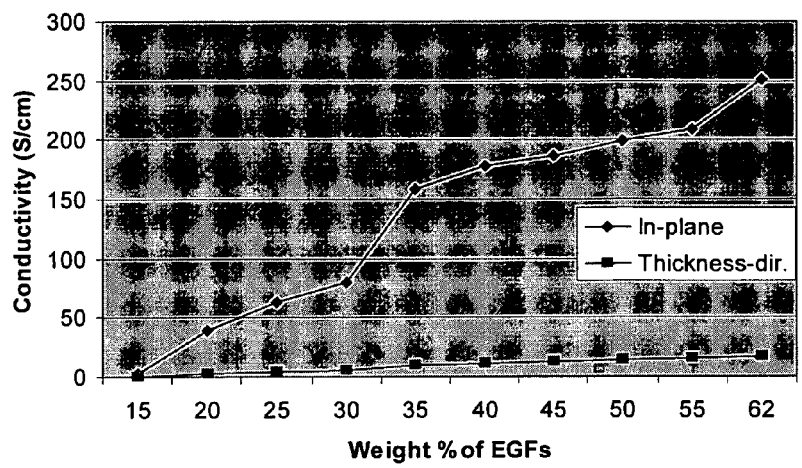
FIG.5(A) In-plane and through-plane conductivity values of EGF-polymer composites.
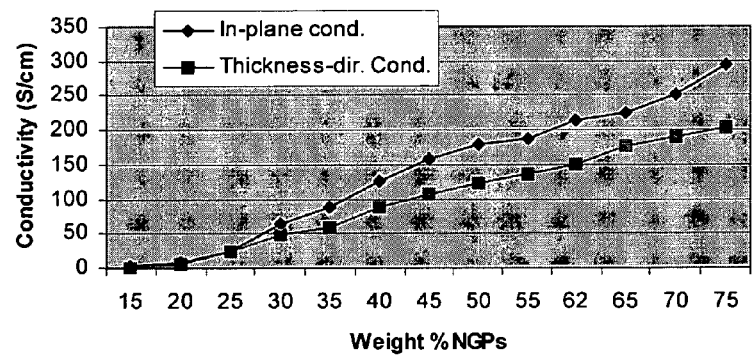
FIG.5(B) In-plane and through-plane conductivity of NGP composites.

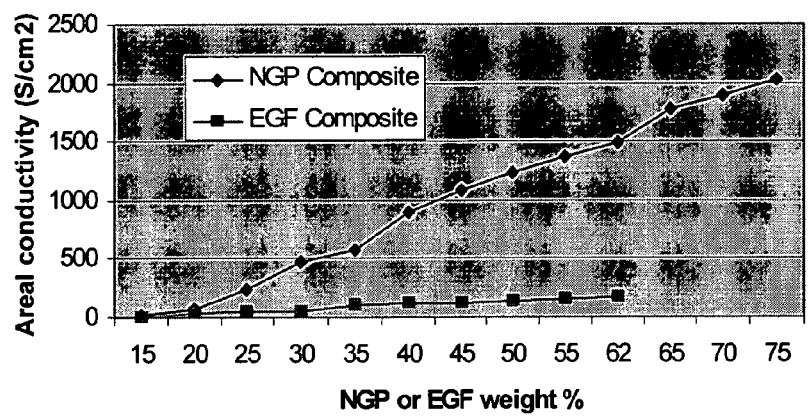
FIG.6 Areal conductivity of NGP- and EGF-polymer composites.

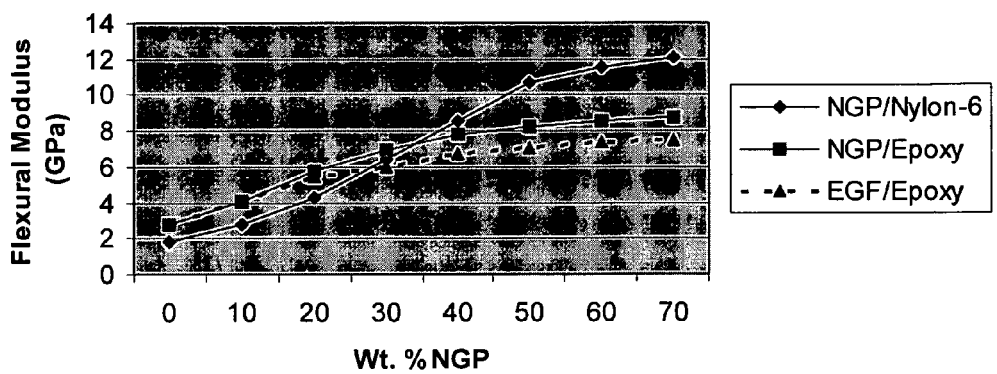
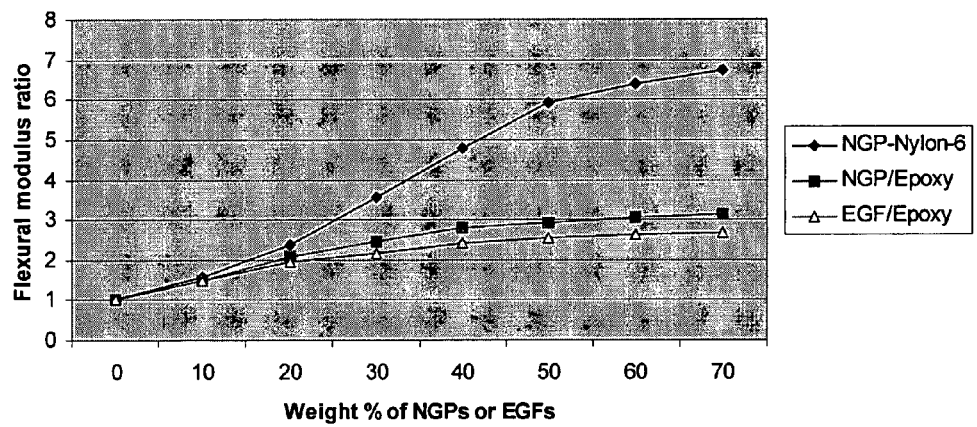

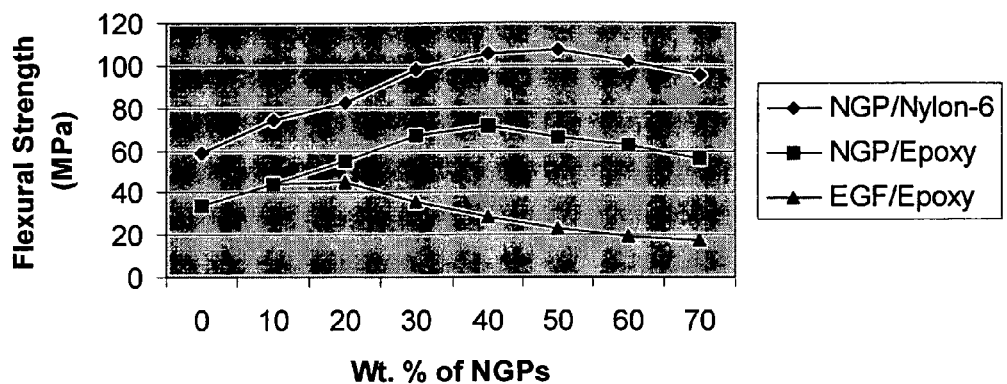
FIG.8(A) Flexural Strength of NGP/Nylon-6, NGP/Epoxy, and EGF/Epoxy Composites.
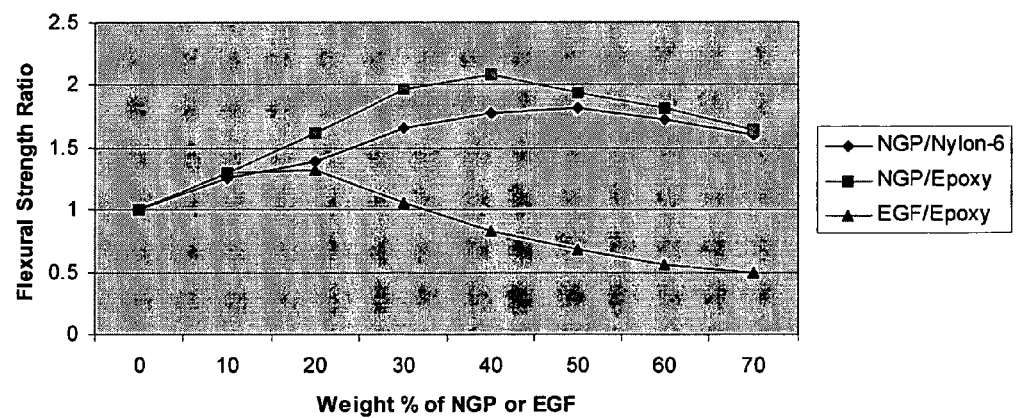
FIG.8(B) Ratio of composite strength to matrix strength.

HIGHLY CONDUCTIVE NANO-SCALED GRAPHENE PLATE NANOCOMPOSITES

This invention is based on the results of a research project sponsored by the US DOE SBIR Program. The US government has certain rights on this invention.

FIELD OF THE INVENTION

The present invention relates generally to the field of nano-composite materials, and more particularly to nano-graphene plate-reinforced composite materials (NGP nanocomposites) and products such as fuel cell bipolar plates and battery electrodes made of these nanocomposites.

BACKGROUND OF THE INVENTION

Carbon nanotubes (CNT) are nanometer-scale sized tube-shaped molecules having the structure of a graphite molecule rolled into a rube. A nanotube can be single-walled or multi-walled, dependent upon conditions of preparation. Carbon nanotubes typically are electrically conductive and mechanically strong and stiff along their length. Nanotubes typically also have a relatively high aspect ratio (length/diameter ratio). Due to these properties, the use of CNTs as reinforcements in composite materials for both structural and functional applications would be advantageous.

However, there are several drawbacks associated with carbon nanotube-reinforced composites. First, CNTs are known to be extremely expensive due to the low yield and low production and purification rates commonly associated with the current CNT preparation processes. The high material costs have significantly hindered the widespread application of CNTs. Second, it is well-known in the field of composites that the reinforcement fiber orientation plays an important role in governing the mechanical and other physical properties of a composite material. However, CNTs tend to form a tangled mess resembling a hairball, which is difficult to work with. This and other difficulties have limited efforts toward realizing a composite material containing well-dispersed CNTs with desired orientations.

Instead of trying to develop much lower-cost processes for making CNTs, researchers (Jang, et al.) at Nanotek Instruments, Inc. have worked diligently to develop alternative nano-scaled carbon materials that exhibit comparable properties, but are more readily available and at much lower costs. This development work has led to the discovery of processes for producing individual nano-scaled graphite planes (individual graphene sheets) and stacks of multiple nano-scaled graphene sheets, which are collectively called nano-sized graphene plates (NGPs). NGPs could provide unique opportunities for solid state scientists to study the structures and properties of nano carbon materials. The structures of these materials may be best visualized by making a longitudinal scission on the single-wall or multi-wall of a nano-tube along its tube axis direction and then flattening up the resulting sheet or plate (FIG. 1(a)). FIG. 1(b) shows an atomic force microscopic picture of a sample of NGPs. In practice, NGPs are obtained from a precursor material, such as minute graphite particles, using a low-cost process, but not via flattening of CNTs. These nano materials could potentially become cost-effective substitutes for CNTs or other types of nano-rods for various scientific and engineering applications.

Specifically, Jang, et al. disclosed a process to readily produce NGPs in large quantities [B. Z. Jang, L. X. Yang, S. C. Wong, and Y. J. Bai, "Process for Producing Nano-scaled Graphene Plates," U.S. patent application Ser. No. 10/858,814 (Jun. 3, 2004)]. The process includes the following procedures: (1) providing a graphite powder containing fine graphite particles preferably with at least one dimension smaller than 200 µm (most preferably smaller than 1 µm; (2) exfoliating the graphite crystallites in these particles in such a manner that at least two graphene planes are fully separated from each other, and (3) mechanical attrition (e.g., ball milling) of the exfoliated particles to become nano-scaled, resulting in the formation of NGPs with platelet thickness smaller than 100 nm. The starting powder type and size, exfoliation conditions (e.g., intercalation chemical type and concentration, temperature cycles, and the mechanical attrition conditions (e.g., ball milling time and intensity)) can be varied to generate, by design, various NGP materials with a wide range of graphene plate thickness, width and length values. We have successfully prepared NGPs with an average length smaller than 500 nm and, in several cases, smaller than 100 nm. Ball milling is known to be an effective process for mass-producing ultra-fine powder particles. The processing ease and the wide property ranges that can be achieved with NGP materials make them promising candidates for many important engineering applications. The electronic, thermal and mechanical properties of NGP materials are expected to be comparable to those of carbon nano-tubes; but NGPs will be available at much lower costs and in larger quantities.

The NGP material can be used as a nano-scaled reinforcement for a matrix material to obtain a nanocomposite. Expected advantages of nano-scaled reinforcements in a matrix material include: (1) when nano-scaled fillers are finely dispersed in a polymer matrix, the tremendously high surface area could contribute to polymer chain confinement effects, possibly leading to a higher glass transition temperature, stiffness and strength; (2) nano-scaled fillers provide an extraordinarily zigzagging, tortuous diffusion path that results in enhanced barrier or resistance against permeation of moisture, oxygen, other gases, and liquid chemical agents. Such a tortuous structure also serves as an effective strain energy dissipation mechanism associated with micro-crack propagation in a brittle matrix such as ceramic, glass, or carbon; (3) nano-scaled fillers can also enhance the electrical and thermal conductivities in a polymer, ceramic or glass matrix; and (4) carbon-based nano-scaled fillers have excellent thermal protection properties and, if incorporated in a matrix material, could potentially eliminate the need for a thermal protective layer, for instance, in rocket motor applications.

In a related subject, exfoliated graphite may be impregnated with a resin to obtain an expanded graphite flake (EGF)-resin composite. Alternatively, expandable graphite particles may be dispersed in a monomer or oligomer and then exfoliated before the monomer/oligomer is polymerized or cured, also resulting in the formation of an expanded graphite flake-resin composite. These conventional exfoliated graphite flake composites are discussed in the following references:

1. P. Xiao, L. Y. Sun, M. Xiao, and K. C. Gong, "Preparation and Properties of Polystyrene/Graphite Nanocomposite," *Materials Res. Soc. Symposium,* 661 (2001) KK5.3.1-KK5.3.6.
2. P. Xiao, M. Xiao, and K. C. Gong, "Preparation of Exfoliated Graphite/Polystyrene Composite by Polymerization-filling technique," *Polymer,* 42, 4813 (2001).
3. M. Xiao, L. Y. Sun, J. J. Liu, Y. Li, and K. C. Gong, "Synthesis and Properties of Polystyrene/Graphite Nanocomposite," *Polymer,* 43-8 (2002) 2245.
4. H. Shioyama, "Polymerization of Isoprene and Styrene in the Interlayer Spacing of Graphite," *Carbon,* 35 (1997) 1664.
5. H. Shioyama, "Review: The Interactions of Two Chemical Species in The Interlayer Spacing of Graphite," *Synthetic Metals,* 114 (2000) 1.

6. G. H. Chen, D. J. Wu, W. Weng, B. He, W. Yan, "Preparation of Polymer/Graphite Conducting Nanocomposites by Intercalation Polymerization." *J. Appl. Polymer Sci.*, 82 (2001) 2506-13.
7. G. H. Chen, C. Wu, W. Weng, D. Wu, and W. Yan, "Preparation of Polystyrene/Graphite Nano-sheet Composite," *Polymer*, 44 (2003) 1781-1784.
8. G. H. Chen, D. Wu, W. Weng, and C. Wu, "Exfoliation of Graphite Flake and Its Nanocomposites," *Carbon*, 41 (2003) 619-621.
9. G. H. Chen, W. Weng, D. Wu, and C. Wu, "PMMA/Graphite Nanosheet Composite and Its Conducting Properties," *Euro. Polymer J.*, 39 (2003) 2329-2335.
10. G. H. Chen, W. Weng, D. Wu, C. Wu, J. Lu, P. Wang, X. Chen, "Preparation and Characterization of Graphite Nanosheets from Ultrasonic Powdering Technique," *Carbon*, 42 (2004) 753-759.
11. J. Zhu, F. M. Uhl, A. B. Morgan, and C. A. Wilkie, "Studies on the Mechanism by Which the Formation of Nanocomposites Enhances Thermal Stability," *Chem. Mater.*, 13 (2001) 4649.
12. Y. X. Pan, Z. Yu, Y. Ou, and G. H. Hu, "A New Process of Fabricating Electrically Conducting Nylon6/Graphite Nanocomposites via Intercalation Polymerization," *J. Polymer Sci., Part B: Polymer Phy.*, 38 (2000) 1626.
13. W. Zheng, S. C. Wong, and H. J. Sue, "Transport behavior of PMMA/expanded graphite nanocomposites," Polymer, 73 (2002) 6767.
14. W. Zheng and S. C. Wong, "Electrical conductivity and dielectric properties of PMMA/expanded graphite composites," *Composite Sci., and Tech.*, 63 (2003) 225.
15. J. W. Shen, X. M. Chen, and W. Y. Huang, "Structure and Electrical Properties of Grafted Polypropylene/Graphite Nanocomposites Prepared by Solution Intercalation", *J. App. Polymer Sci.*, 88 (2003) 1864-1869.
16. W. P. Wang and C. Y. Pan, "Synthesis and Characterization of Poly(ethylene Oxide) Methyl Ether Grafted on the Expanded Graphite with Isocyanate Groups," *Euro. Polymer J.*, 40 (2004) 543-548.
17. H. Fukushima and L. T. Drzal, "Graphite Nanoplatelets As Reinforcements for Polymers: Structural and Electrical Properties," *Proc. Of the 17th Annual Conf. of the Am. Soc. For Composites*, Purdue University, (2003).
18. H. Fukushima, S. H. Lee, and L. T. Drzal, "Graphite Platelet/Nylon Nanocomposites," Proc. of SPE ANTEC (2004) 1441-1445.
19. A. Yasmin, J. J. Luo, and I. M. Daniel, "Processing of Graphite Nanosheet Reinforced Polymer Nanocomposites," Proc. of the 19th ASC/ASTM Joint Tech Conf., E. Armeiros, Ed., Ga Tech, Atlanta, CDROM, 2004.
20. A. Yasmin and I. M. Daniel, "Mechanical and thermal Properties of Graphite Platelet/Epoxy Composites," *Polymer*, 45 (2004) 8211-8219.
21. J. Mack, L. Viculis, A. Ali, R. Luoh, G. Yang, R. Kaner, T. Hahn, and F. Ko, "Graphite Nanoplatelet Based Nanocomposites by the Electrospinning Process," *Proc. Of the 17th Annual Conf. of the Am. Soc. For Composites*, Purdue University, (2003).
22. R. S. Caines, "Vermicular Expanded Graphite Composite Material," U.S. Pat. No. 4,199,628 (Apr. 22, 1980).
23. A. W. Atkinson, D. R. Hurst, and K. T. Somerfield, "Housing for Electrical or Electronic Equipment," U.S. Pat. No. 4,530,949 (Jul. 23, 1985).
24. D. D. L. Chung, "Low-Density Graphite-Polymer Electrical Conductors," U.S. Pat. No. 4,704,231 (Nov. 3, 1987).
25. D. D. L. Chung, "Composites of In-Situ Exfoliated Graphite," U.S. Pat. No. 4,946,892 (Aug. 7, 1990).
26. L. R. Bunnell, Sr., "Enhancement of the Mechanical Properties by Graphite Flake Addition," U.S. Pat. No. 4,987,175 (Jan. 22, 1991).
27. L. R. Bunnell, Sr., "Enhancement of the Mechanical Properties of Polymers by Graphite Flake Addition and Apparatus for Producing Such Thin Flakes," U.S. Pat. No. 5,019,446 (Nov. 19, 1991).
28. L. R. Bunnell, Sr., "Method for Producing Thin Graphite Flakes with Large Aspect Ratios," U.S. Pat. No. 5,186,919 (Feb. 16, 1993).
29. T. P. Hayward, "Method of Making Graphite Foam Materials," U.S. Pat. No. 5,582,781 (Dec. 10, 1996).
30. L. T. Drzal and H. Fukushima, "Expanded Graphite and Products Produced Therefrom," U.S. patent application Ser. No. 10/659,577 (Sep. 10, 2003).

These prior-art composites have the following drawbacks:

A). Although the expanded graphite flake (EGF) thickness is typically smaller than 100 nm, the width and length (or diameter) of the plate-like fillers in these composites are typically much greater than 1 μm and more typically in the range of 10-200 μm [e.g., Refs. 6-9 (TEM micrographs), 10 (FIG. 2 & Table 1), 24-30]. Strictly speaking, these fillers are not nano-scaled fillers and the composites are not nano-composites. In the field of composites, micron-sized fillers often result in the formation of micron-sized defects, hence compromising the composite strength. Only when both the flake thickness is smaller than 100 nm and the flake length is shorter than 1 μm, can the EGFs qualify as NGPs.

B). Due to processing difficulties, those EGF composites with a high EG flake proportion (e.g., >50% by weight) tend to be highly porous and of low strength; e.g., density as low as $0.7 \text{ g/cm}^3$ and flexural strength lower than 3 MPa being reported in [Refs. 24 and 25]. The fillers are typically characterized as having substantially un-separated flakes or platelets and having many pores between platelets that are not accessible by the resin. These high-loading EGF composites have been prepared exclusively by "intercalation and in situ polymerization" method (by intercalating graphite particles with a monomer and then polymerizing the monomer in situ, or between graphene layers) [e.g., Refs. 1,2]. For fully separated, individual plates dispersed in a polymer, the viscosity is typically too high to be processable by mass production techniques such as extrusion, injection molding, or even compression molding (hot press molding). In these composites, the weight fractions of graphite flakes are typically smaller than 15% [e.g., Refs. 7-10, 13, 14, 17-19, 30].

C). It has been recently recognized by researchers in the field of composites that thin exfoliated graphite flakes, with extremely high aspect ratio (length/thickness ratio>100~1000), lead to a lower percolation threshold (typically 1-4% by weight EGF) for forming an electron-conducting path [e.g., Refs. 1, 2, 6-9, 12-15, 17, 18, 30], as compared to a threshold of typically 5-20% for other types of graphite particles. However, at these threshold EGF loadings, the electrical conductivity of the resulting composite, typically in the range of $10^{-5}$-$10^{-1}$ S/cm, is still too low for many useful engineering applications. For instance, the US Department of Energy (DOE) has set forth a target bulk conductivity of 100 S/cm and experts in the fuel cells industry have identified a target areal conductivity of 200 S/cm² for composite-based fuel cell bipolar plates. Even with high EGF loadings [e.g., Refs. 24,25] in the case of EGF composites, electrical conductivity was typically 2 S/cm or lower.

D). Conventional EGF composites with a high EGF loading either can not be formed into thin composite plate, can not be molded with mass production techniques, or are simply not processable into useful products. Although one would expect the electrical conductivity of an EGF composite to become higher if the EGF loading is greater (e.g., >20% by weight), no melt-blended composite containing more than 20% by weight of well-dispersed, fully separated EG flakes has hitherto been reported. The high EGF loading (up to 62 wt. %) reported by Xiao, et al [Ref. 1] was for highly porous, un-separated expanded graphite sheets clustered together. The composite in this case was formed by "intercalation and in situ polymerization." Again, these porous structures led to weak composites. Furthermore, the approach of "intercalation and in situ polymerization" is applicable to only a limited number of polymers that have a wide window of synthesis conditions such as polystyrene and nylon-6. This process is typically slow and, hence, expensive. For instance, in situ polymerization of ε-caprolactam to produce nylon-6 requires a reaction time of 20 hours [e.g., Ref. 12]. A vast majority of the existing polymers cannot be prepared in this manner. Alternatively, solution blending was used to prepare EGF/PMMA composites [Refs. 13,14], but residual solvent can be problematic. A need exists for a cost-effective method of preparing directly melt-blended EGF/polymer composites with a high EGF loading.

E). No non-polymeric matrices have hitherto been reported for use in making nanocomposites containing separated EG flakes that are of good structural integrity. Carbon-, ceramic, metal, and glass matrix composites can be used in applications that require high temperature environments.

Thus, it is an object of the present invention to provide a composite that contains fully separated graphite platelets with a sufficient amount effective for achieving a high composite conductivity (greater than 10 S/cm and, preferably greater than 100 S/cm).

It is another object of the present invention to provide a composite that contains fully separated graphite platelets with a sufficient amount effective for achieving a high areal conductivity (greater than 200 S/cm$^2$) for the composite.

It is yet another object of the present invention to provide a composite comprising fully separated graphite platelets that are smaller than 1 μm in length, width or diameter (preferably smaller than 0.5 μm or 500 nm) and smaller than 100 nm in thickness.

Still another object of the present invention is to provide a composite comprising at least 20% by weight of fully separated graphite platelets. A specific object of the present invention is to provide a composite comprising 35%-75% by weight of fully separated graphite platelets. A further specific object of the present invention is to provide a composite, comprising 35%-75% by weight of fully separated graphite platelets, which can be made into a thin plate (thinner than 3 mm, preferably no thicker than 1 mm).

It is still another object of the present invention to provide a composite comprising fully separated graphite platelets that are smaller than 1 μm in length, width or diameter (preferably smaller than 0.5 μm or 500 nm) and smaller than 100 nm in thickness; the composite can be mass produced into desired products (e.g., fuel cell bipolar plates) using cost-effective processing techniques.

It is still another object of the present invention to provide a composite comprising fully separated graphite platelets that are smaller than 1 μm in length, width or diameter (preferably smaller than 0.5 μm or 500 nm) and smaller than 100 nm in thickness; the composite can be mass produced into desired products without involving slow in situ polymerization or use of a chemical solvent.

It is still another object of the present invention to provide a composite comprising fully separated graphite platelets that are smaller than 1 μm in length, width or diameter (preferably smaller than 0.5 μm or 500 nm) and smaller than 100 nm in thickness which are dispersed in a carbon, glass, ceramic, or metal matrix.

SUMMARY OF THE INVENTION

A preferred embodiment of the present invention is a nanocomposite material comprising fully separated nano-scaled graphene platelets (NGPs) dispersed in a matrix material, wherein each of the platelets comprises a sheet of graphite plane or multiple sheets of graphite plane and has a thickness no greater than 100 nm and the platelets have an average length, width, or diameter no greater than 500 nm. The graphene plates are present in an amount no less than 15% by weight based on the total weight of the NGPs and the matrix material. This amount is preferably chosen to make the resulting nanocomposite electrically conductive with a bulk conductivity no less than 10 S/cm (preferably no less than 100 S/cm) or an areal conductivity no less than 200 S/cm$^2$, measured on the basis of a nanocomposite thickness of 1 mm. Typically, high conductivity is achieved with the NGP amount being between 35% and 75% by weight. Very high bulk electrical conductivity (>200 S/cm) is obtained when the NGP amount is no less than 60% by weight or no less than 45% by volume. The matrix material may comprise a material selected from the group consisting of a polymer, a carbon, a ceramic, a glass, and combinations thereof. A polymer matrix material may be a thermoplastic, a thermoset, a rubber, and combinations thereof. Preferably, most of the platelets have a length, width, or diameter no greater than 100 nm.

Within the NGP loading range of 15% to 75% by weight, the ratio of the flexural strength of the nanocomposite to the flexural strength of the corresponding matrix material is typically greater than 1.3 and/or the ratio of the flexural modulus of the nanocomposite to the flexural modulus of the matrix material is greater than 2. In several cases, a ratio of the nanocomposite flexural strength the flexural strength of the corresponding matrix material as high as 2, or a ratio of the nanocomposite flexural modulus to the flexural modulus of the matrix material as high as 6 has been achieved.

Another preferred embodiment of the present invention is a composite plate comprising fully separated nano-scaled graphene platelets dispersed in a matrix material, wherein each of the platelets comprises a sheet of graphite plane or multiple sheets of graphite plane and has a thickness no greater than 100 nm. The graphene platelets are present in an amount sufficient to make the composite plate electrically conductive with a thickness-direction conductivity no less than 20 S/cm (preferably no less than 100 S/cm) or an areal conductivity no less than 200 S/cm$^2$, measured on the basis of a plate thickness of 1 mm. The desirable platelet amount is between 20% and 75% by weight based on the total weight of the platelets and the matrix combined. The high thickness-direction conductivity is obtained when the platelet amount is no less than 45% by weight or no less than 30% by volume. The matrix material may comprise a polymer, a carbon, a ceramic, a glass, or a combination thereof. A polymer matrix material may comprise a polymer selected from the group consisting of a thermoplastic, a thermoset, a rubber, and combinations thereof. Preferably, most of the platelets have a length, width, or diameter no greater than 100 nm.

BRIEF DESCRIPTION OF THE DRAWINGS

FIG. 4 In-plane conductivity of both the expanded graphite flake-polystyrene (EGF/PS) composite and the NGP-polystyrene nanocomposite as a function of EGF or NGP weight fraction: (A) in a 10-based log scale over a wide weight percent range and (B) in linear scale over a more useful weight % range.

FIG. 5 In-plane and thickness-direction conductivity of (A) EGF/PS composites and (B) NGP/PS nanocomposites.

FIG. 6 Areal conductivity of EGF/PS and NGP/PS composites in the thickness direction, based on a plate of 1 mm thick.

FIG. 7 (A) Flexural modulus values of NGP/Nylon-6, NGP/Epoxy, and EGF/Epoxy composites and (B) their composite modulus-to-matrix modulus ratios.

FIG. 8 (A) Flexural strength of NGP/Nylon-6, NGP/Epoxy, and EGF/Epoxy composites and (B) their composite strength-to-matrix strength ratios.

DESCRIPTION OF THE PREFERRED EMBODIMENTS

Figure 1A:
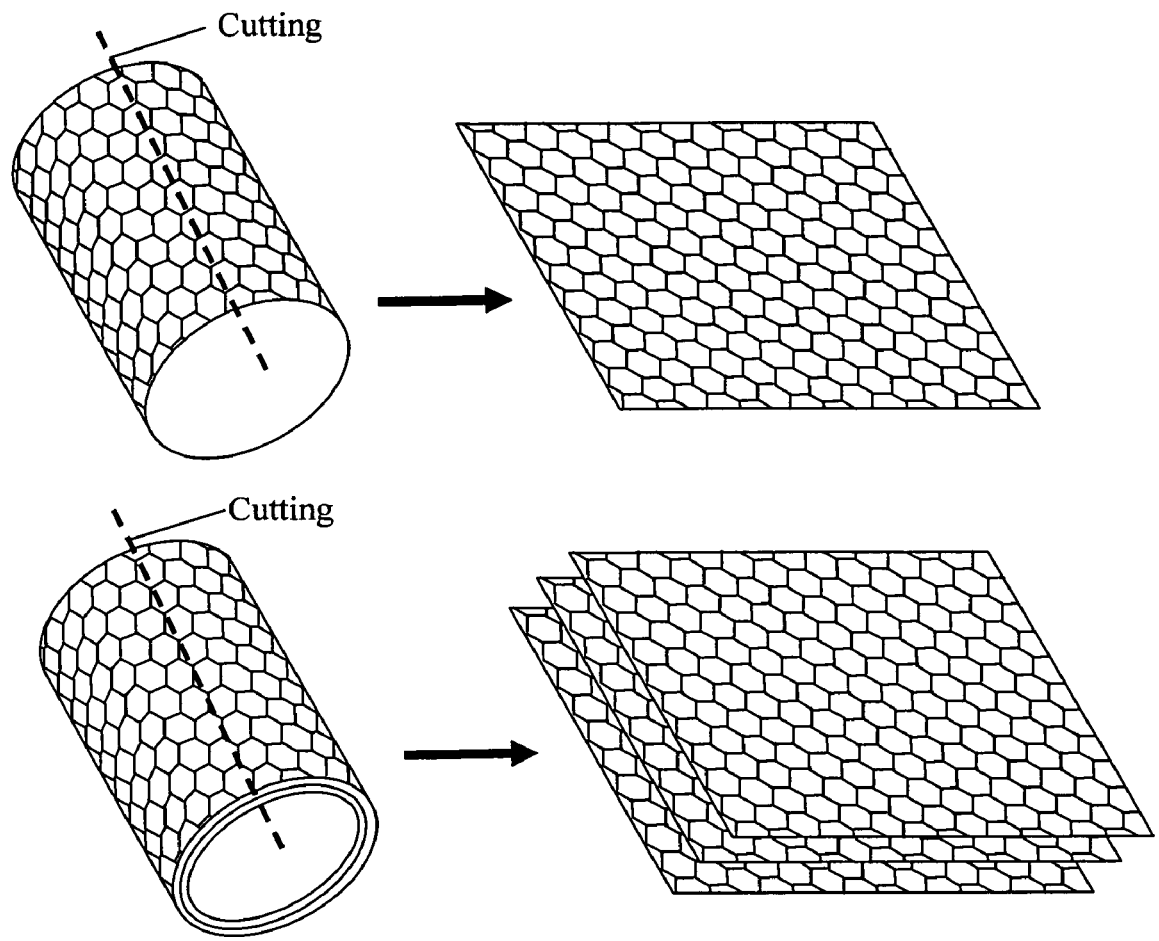
FIG. 1(*a*) Schematic of NGP structures in comparison with CNT structures; (*b*) Atomic force microscopic image of selected NGPs.
Figure 1B:
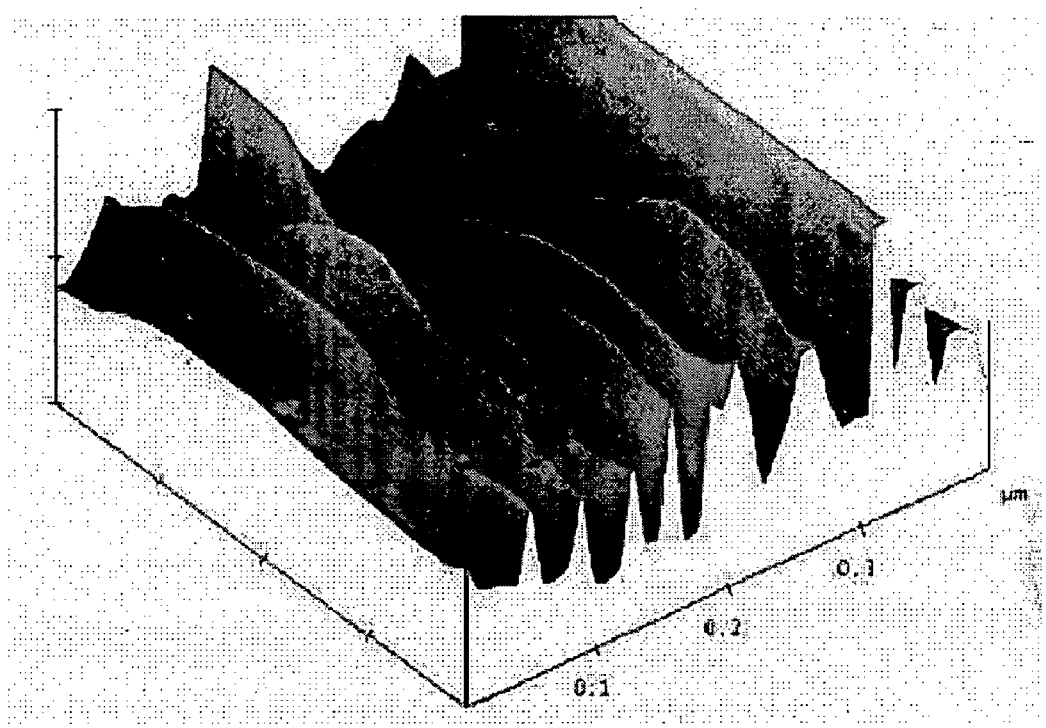

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

For the purpose of defining the geometry and orientation of an NGP, the NGP is described as having a length (the largest dimension), a width (the second largest dimension), and a thickness. The thickness is the smallest dimension, which is no greater than 100 nm. When the platelet is approximately circular in shape, the length and width are referred to as diameter. In the presently defined NGPs, both the length and width are smaller than 1 μm and more preferably and typically smaller than 0.5 μm (500 nm). We have been able to produce NGPs with length smaller than 100 nm. In the present context, expanded graphite flakes (EGF) are those thin flakes or platelets that have a thickness smaller than 100 nm, but with length and width being greater than 1 μm, typically greater than 10 μm, and most typically between 10μ and 200 μm.

A preferred embodiment of the present invention is a nanocomposite material comprising fully separated nano-scaled graphene platelets (NGPs) dispersed in a matrix material, wherein the platelets have a thickness no greater than 100 nm and an average length, width, or diameter no greater than 500 nm. These nano-scaled graphene plates are present in an amount no less than 15% by weight based on the total weight of the NGPs and the matrix material combined. This amount is selected to be sufficiently high to make the nanocomposite electrically conductive with a bulk conductivity no less than 10 S/cm or an areal conductivity no less than 200 S/cm$^2$, measured on the basis of a composite plate thickness of 1 mm. Preferably, the nanocomposite has a bulk conductivity no less than 100 S/cm. It was found that this amount of NGPs is typically between 20% and 75% by weight to obtain a bulk conductivity of 100 S/cm (plus other desired mechanical properties) and this amount is no less than 60% by weight or no less than 45% by volume to achieve a bulk conductivity of 200 S/cm. The preparation and characteristics of NGP nanocomposites are further described in what follows:

With an NGP or EGF proportion less than 15% by weight, conventional apparatus such as a static mixer and an extruder (particularly, a twin-screw extruder) can be used to produce an NGP-polymer or EGF-polymer blend. Useful parts with a desired geometry can be made using compression molding and injection molding. As indicated earlier, however, an EGF-polymer composite with an EGF weight fraction greater than 15% has been difficult to make using conventional melt processing techniques such as melt extrusion and injection molding presumably due to the extremely high melt viscosity. This is likely one of the main reasons why a structurally strong and/or functionally useful (e.g., highly conductive) EGF composite part with a high EGF loading thus far has not been reported.

Figure 2:
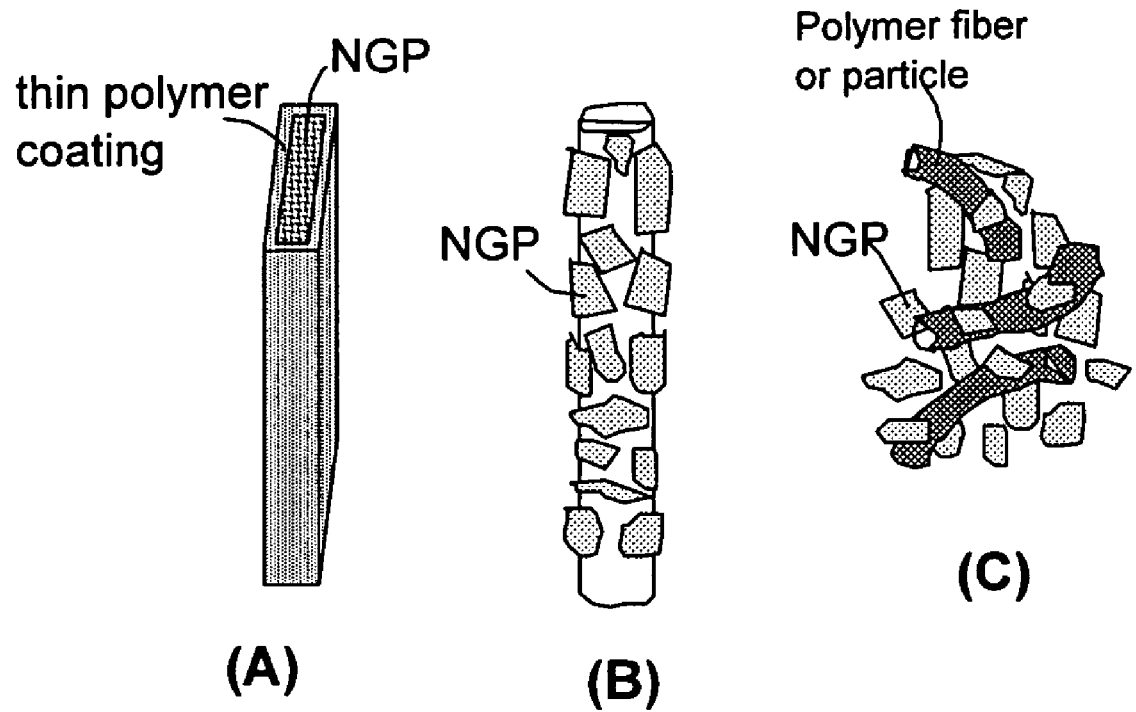
FIG. 2 Three basic forms of solid NGP-polymer blends: (A) thin polymer-coated NGP, (B) NGP-coated polymer fiber, and (C) mixture of fine polymer fibers/powders and NGPs.

Our recent studies have led to a surprising conclusion that several processing techniques can be used to combine fully separated EGFs or NGPs with a polymer matrix to make a composite with a high proportion of EGF or NGP platelets that are uniformly dispersed in the matrix. All these techniques have one feature in common: they all begin with an intimate blending of a solid polymer and solid EGF or NGP platelets. This state of intimate blending is such that the matrix polymer, after being brought to a molten state, only needs to locally flow to a very short distance (e.g., from nanometer to approximately 20 microns) during a bulk molding process (e.g., hot pressing or compression molding). This feature overcomes the high viscosity problem of these composites with a high EGF or NGP loading. It is now possible to mass produce these otherwise hard-to-process composites. Further surprisingly, these composites exhibit outstanding mechanical and electrical properties that could not be achieved by conventional composites comprising graphite particles or carbon blacks. Even more surprisingly, high NGP-loading composites exhibit better properties than their EGF counterparts. These observations are further described as follows:

As shown in FIG. 2, there are three basic forms of intimate blending between a solid polymer and solid EGF or NGP platelets—a polymer-coated NGP or EGF (FIG. 2(A)), an NGP- or EGF-adhered polymer fiber (FIG. 2(B)), and a mixture of fine polymer powders or fibers with NGPs or EGF (FIG. 2(C)). These precursors to composites may be prepared by following the following routes:

A. Solution Coating Route:

In one preferred embodiment, polymer-coated NGPs or EGFs can be prepared by dispersing NGPs or EGFs in a dilute polymer-solvent solution. Examples are 1-5% polystyrene in benzene or toluene and 1-50% epoxy/curing agent in acetone. By stir-mixing these platelets in the solution, separating these platelets from the solution via filtering, and then removing the solvent (in a vacuum oven or chemical fume hood) one obtains NGP or EGF platelets which are each surface-coated with a thin layer of polymer (a thermoplastic or thermosetting resin). For the cases of thermoplastics such as polystyrene and nylon with a glass transition temperature or melting point higher than room temperature, the resulting mass upon solvent vaporization is a solid mixture which can be size-reduced to granules or pellets via ball-milling or grinding for subsequent molding. For thermosetting resins such as epoxy, the NGP/resin/solvent mixture (a suspension) may be subjected to spin-casting or direct solution casting into a mold cavity. Solution coating is the only method herein studied that involves utilization of a solvent.

It may be noted that both NGP/thermoplastic or EGF/thermoplastic composites also can be made by using spin-casting or direct solution casting techniques, but the resulting composites (particularly EGF-based) tend to be more isotropic in two dimensions, as opposed to more isotropic in three dimensions for those composites prepared via the aforementioned route (filtering, solvent removal, grinding, and molding). In all cases, EGFs tend to develop 2-D isotropy (e.g., electrical conductivity of a EGF/composite plate being greater in all planar directions than in the thickness direction) due to the facts that EGF platelets tend to stack up over each other to form laminar structures and electrical conductivity of an EGF is orders of magnitude higher in its planar directions than in the thickness or c-axis direction. By contrast, NGP/polymer composites tend to show 3-D isotropy (e.g., electrical conductivity being relatively independent of the direction along which the property is measured). The thickness direction conductivity of NGP composites is much higher than that of their EGF counterparts. This feature is very significant for certain engineering applications. For instance, in fuel cell bipolar plates, the thickness-direction conductivity, not just the in-plane conductivity, must be high in order to reduce the contact resistance or joule losses during a fuel cell operation.

B. Tow-preg Route:

In another preferred embodiment, an NGP-coated thermoplastic fiber tow may be prepared by using, as an example, a fluidized-bed coating technique. In a fluidized bed, air is pumped into a chamber through minute holes at the bottom side of the chamber. The powder particles in the chamber is forced to flow around inside the chamber much like a fluid. A continuous fiber, either a monofilament or a fiber tow, is introduced into the chamber where powder particles (NGPs or EGFs in the present case) are floating around. These particles are adhered to the surface of the fiber to produce an NGP- or EGF-coated fiber tow which then exits the chamber. Electrical charges can be injected into the chamber to facilitate particle coating onto the fiber surface. Such an NGP-coated tow (or "tow-preg") is then woven or wound into a preform structure, or simply chopped into short segments that are stacked in a cavity of a mold for subsequent hot pressing. When the fiber is melted, the resulting polymer fluid flows around individual NGPs to become the matrix material of a composite. The polymer melt does not have to move to a long distance, only a distance up to the fiber diameter size which is typically 20 µm or smaller.

Figure 3A:
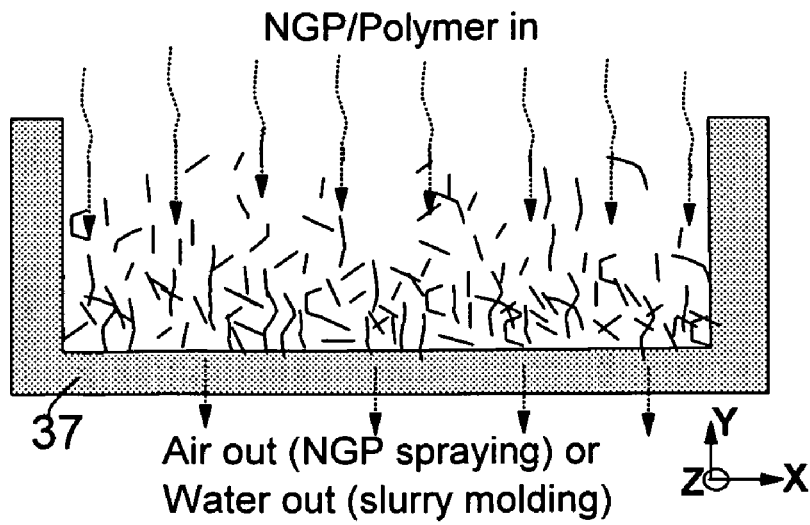
FIG. 3 (A) Schematic of a slurry molding- or directed platelet/resin spray-based process for producing an intimate blend of NGPs and a polymer; (B) A continuous process for producing NGP-composites.

C. Slurry Molding Route:

In another preferred embodiment of the present invention, a porous preform material (a precursor to composite) can be made to an appropriate shape by a conventional slurry molding technique using NGPs, possibly along with a small amount of carbon nano-fibers (CNFs), carbon nanotubes (CNTs) or other nano-scaled fillers, if so desired. An aqueous slurry is prepared which comprises a mixture of NGPs with an intended matrix polymer, and possibly along other conductive ingredients such as carbon fibers, metal fibers, CNTs, CNFs, EGFs, carbon blacks, metal particles, or a combination thereof. The matrix polymer is typically a thermoplastic in a powder, granule, or, preferably, fibrous or filamentous form. The slurry, consisting of NGPs, other optional fillers, polymer particles/fiber segments, and water, is forced through a sieve or mold screen of a desired mesh size to trap the solids (allowing water to go through), thus producing a wet monolithic, which is subsequently dried at a temperature of less than 80° C. This mold screen may be a part of a mold 37 (FIG. 3(A). The initial porosity of the preform in the slurry molded and dried condition is typically in the range 30-70%. If necessary, the dried monolith preform is further densified via compression. The resulting solid mixture may be transferred to a hot pressing mold cavity for compression molding into a useful shape, such as a fuel cell bipolar plate or battery electrode. During the molding procedure, the thermoplastic fibers or powders get melted and the resulting polymer fluid flows around the reinforcement elements (i.e., NGPs and EGFs.) to become the matrix of a composite.

The same procedure can be adapted for processing NGP- or EGF-thermoset composites. For instance, phenolic resin powder, instead of thermoplastic fibers, may be used in the slurry. Subsequent molding may include curing the resin in a shaped steel mold at a temperature in the range of about 120° C. to about 160° C.

D. Platelet/Resin Spraying Route:

In another preferred embodiment, the porous preform can be made by using a platelet/resin spraying technique. The directed platelet spray-up process utilizes an air-assisted gun which conveys reinforcement elements (NGPs and/or EGFs) and a resin to a molding tool (e.g., a perforated metal screen shaped identical or similar to the part to be molded). In addition to NGPs or EGFs, other conductive ingredient such as metal fibers, carbon nano-tubes, graphitic nano-fibers, carbon fibers, carbon blacks, or a combination thereof can be a part of the air-driven stream of preform ingredients that impinges upon the metal screen. This shaped screen is a part of a mold 37 (FIG. 3(A)). The NGPs or EGFs may be held in place on the screen by a large blower drawing air through the screen. Once the desired thickness of reinforcement has been achieved, the spraying system is turned off and the preform is ready for subsequent molding operations, which could entail polymerizing or curing the resin (if thermosetting) or heating and cooling the resin (if thermoplastic). Surface features of a part, such as fluid flow field channels of a fuel cell separator plate, can be made using matched-die molding and embossing.

Figure 3B:
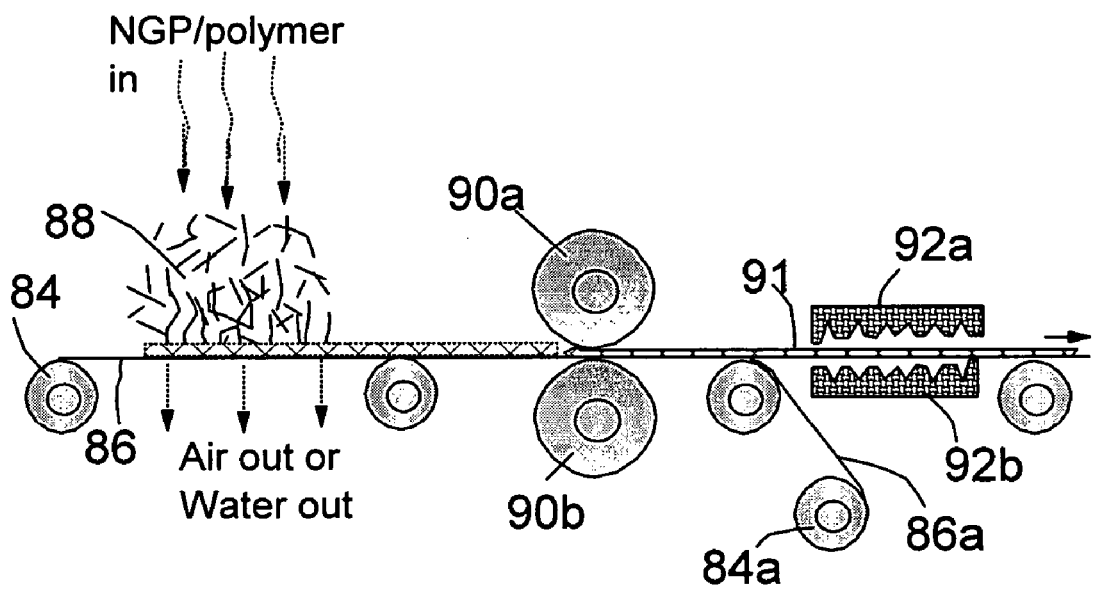

Both the slurry molding and directed spraying routes can be implemented as a continuous process. For instance, as shown in FIG. 3(B), the process begins with pulling a web 86 (porous sheet) from a roller 84. The moving web receives a stream of slurry 88 (as described in the above-described slurry molding route) from above the web. Water sieves through the web with all other ingredients (a mixture of NGPs and thermoset powders or thermoplastic fibers, etc.) remaining on the surface of the web. These solid ingredients are moved forward to go through a compaction stage by a pair of compaction rollers 90a, 90b. Heat may be supplied to the mixture before, during, and/or after compaction to begin to cure the thermoset resin or begin to melt the thermoplastic. The mixture or preform then goes through embossing or matched-die molding by a pair of embossing rollers or matting mold platens 92a, 92b to produce the desired part. For fuel cell plate applications, for instance, embossing roller surfaces or mold platen surfaces may be properly shaped to create flow channels on one or both major surfaces of the preform when it is being consolidated. Preferably, the moving web 86a is separated from the preform 91 and collected by a winding roller 84a. It is also preferred that the mold platens 92a, 92b are replaced by a pair of embossing rollers (not shown). Alternatively, the compaction rollers 90a, 90b may also serve as embossing rollers for creating flow channels. In this latter case, the mold platens 92a, 92b will not be needed.

A cutting device may be installed to separate individual plates in-line.

Similar procedures may be followed for the case where the mixture 88 of NGPs or EGFs and polymer powders or fibers is delivered to the surface of a moving web 86 by compressed air, like in a directed platelet/resin spraying route described above. Air will permeate through the web with other solid ingredients trapped on the surface of the web, which are conveyed forward. The subsequent operations are similar to those involved in the continuous slurry molding route.

The type and proportion of the conductive filler are preferably chosen in such a way that the bulk conductivity of the resulting resin mixture is greater than 100 S/cm and further preferably greater than 200 S/cm. The US Department of Energy conductivity target for composite-based fuel cell bipolar plates is 100 S/cm. Another commonly accepted target is for the composite bipolar plate to have an areal conductivity no less than 200 S/cm$^2$ in the thickness direction. This value contributes to fuel cell resistance of 0.005 ohm-cm$^2$, which is considerably less than the approximately 0.1 ohm-cm$^2$ contributions of other components of a unit cell. The resistance of a plate along the thickness direction is given by $R=\rho(t/A)=(1/\sigma)(t/A)$, where $\rho$=thickness-direction resistivity, $\sigma$=thickness-direction conductivity, t=plate thickness, and A=plate cross-sectional area. The areal conductivity is defined as $(1/AR)=1/(\rho t)=\sigma/t$.

The in-plane and through-plane (thickness-direction) conductivities of two series of polystyrene composites were investigated with the purposes of (a) comparing the properties of EGF-polymer composites prepared by "intercalation and in situ polymerization" [Refs. 1,2] and those of EGF-polymer composites prepared via the inventive solution coating route and (b) comparing the properties of EGF-polymer composites and corresponding NGP-polymer composites. As shown in FIG. 4(A) and FIG. 4(B), the in-plane conductivity values of the EGF composites prepared by the solution coating route (represented by the solid diamond data points) are comparable to those of the in situ polymerized samples prepared by Xiao, et al. [Refs. 1,2]. The percolation threshold for forming electron-conducting paths is approximately 2% by weight EGF (average flake length 120 μm), which is similar to the 1.5-2.0% observed by Xiao, et al. (Their flakes have an average length of approximately 300 μm). The solid circle lines of FIGS. 4(A) and 4(B) show the in-plane conductivity values of the corresponding NGP-polymer composites. With much smaller platelets (average platelet length=0.42 μm) the percolation did not occur until the NGP loading reaches approximately 15% by weight. At identical filler proportions above the percolation threshold, the in-plane conductivity values for EGF composites are slightly higher than those for NGP composites, although the latter values are still quite impressive. The in-plane conductivity exceeds 100 S/cm with NGP weight fraction greater than 38% and exceeds 200 S/cm with a 60% NGP or more.

More significantly, the thickness-direction conductivity of NGP composites is far superior to that of their EGF counterparts. As shown in FIG. 5(A), the thickness-direction conductivity of EGF composite plates is drastically different than their in-plane conductivity, indicating the significant anisotropic nature of EGF composites. In a molded or cast plate, physically large EG flakes tend to form a laminar structure with individual flakes stacking one upon another, aligning perpendicular to the plate thickness direction. Electrons would have to hop between graphene planes in the c-axis direction, along which conductivity is very low. By contrast, as shown in FIG. 5(B), the thickness-direction conductivity of NGP composites is only slightly lower than their in-plane conductivity. The thickness-direction conductivity values are relatively high, leading to an areal conductivity of a 1-mm thick plate being greater than 200 S/cm$^2$ when the NGP loading is approximately 25 weight % or higher (FIG. 6).

Outstanding mechanical properties also have been achieved with NGP composites, which are typically much better than corresponding properties of EGF composites. Shown in FIGS. 7(A) and 7(B) are, respectively, the flexural modulus values of three composites and composite-to-matrix flexural modulus ratios of the same three composites—NGP/Nylon-6, NGP/Epoxy, and EGF/Epoxy. The average NGP length in both Nylon-6 and epoxy nanocomposites is approximately 0.43 μm and the average length of the EG flakes in EGF/Epoxy is approximately 14.6 μm. An increase by 2 to 6.7 times in modulus can be achieved with addition of 20% to 70% by weight NGPs or EGFs in both thermoplastic and thermoset resins. The NGPs, being much smaller in size than EGFs, appear to be more effective in enhancing the modulus.

The corresponding flexural strength data are also quite interesting (FIGS. 8(A) and 8(B)). Although EGFs are effective in increasing the strength of epoxy resin at a low filler proportion, the composite strength begins to decrease when the EGF loading is beyond 20% by weight and even drops below the strength of the neat resin when the EGF loading is higher than 30% by weight. In contrast, the strength of NGP/Nylon-6 and NGP/Epoxy continues to increase until NGP fraction reaches 40%-50% by weight, beyond which the flexural strength begins to decrease with a further increase in NGP fraction, but never decreases below the original strength of the neat resin. The poorer performance of EGF composites is presumably due to the difficulty in dispersing EG flakes when their sizes are large, leading to a greater tendency to form large defective areas that weaken the composite. In contrast, with NGPs being nano-scaled, any resulting defects would also tend to be nano-scaled and, hence, the fracture strength would be much higher. This could be understood based on the Griffith Equation: strength=$(2*E\gamma/\pi\alpha)^{1/2}$, where E=elastic modulus, $\gamma$=surface energy, and $\alpha$=defect size. With a much smaller $\alpha$, the fracture strength would be higher. The possibly large defect sizes associated with large EGFs would decrease the strength.

The inventive nanocomposites could have non-polymeric matrices. For instance, NGP/phenolic resin can be subjected to pyrolyzation treatments to convert phenolic resin to a carbon matrix, resulting in a NGP carbon/carbon nanocomposite. Carbonization of a polymer, either thermoplastic or thermoset, can be conducted in an inert atmosphere at a temperature in the range of 300-500° C. first, which is then followed by a higher temperature treatment at 1000-2500° C. The resulting structure is highly porous and the pores can be refilled with a polymer, which is then subjected to pyrolyzation treatments again. The same procedure can be repeated until a desired density level is achieved. Alternatively, the porous structure may be subjected to a chemical vapor infiltration (CVI) treatment to fill the pores with carbon, typically glassy carbon. These NGP-based carbon matrix nanocomposites (C/C nanocomposites) obtained have a bulk conductivity in the range of approximately 300-500 S/cm. NGP nanocomposites are particularly useful for fuel cell bipolar plate and battery electrode applications where conductivity is a major concern, as well as for automotive friction plates and aircraft landing gear brake pads where mechanical integrity, friction and wear properties are critical.

In addition to carbon, NGPs may also be used to reinforce metal, ceramic, or glass matrices. For instance, the strength and modulus of aluminum can be significantly enhanced with addition of 2-35% by weight of NGPs. These composites may be prepared via dry blending, followed by powder sintering or metal casting. The fracture toughness of ceramic and glass matrices can be improved by NGPs through effective strain energy dissipation mechanisms such as interfacial debonding, platelet pull-out, tortuous crack propagation path, and crack blunting. The desired NGP loading in these nanocomposites, prepared by sintering or hot pressing, are between 2% and 25% by weight.

As indicated earlier, additional fillers (preferably nano-scaled) may be added to the NGP composites to modify other properties such as friction, wear, strength, stiffness, and toughness. These nano-scaled fillers may be selected from the group consisting of carbon nanotubes, carbon nano fibers, carbon blacks, metal nano-powders, and combinations thereof.

In conclusion, we have successfully developed a new and novel class of nanocomposites that contain truly nano-scaled graphene platelets which have platelet thickness smaller than 100 nm and platelet length shorter than 1 μm (typically shorter than 0.5 μm). These NGPs are comparable in chemical structure and dimensions to carbon nanotubes and, hence, are expected to provide comparable reinforcement effects to a matrix material, which is found to be the case. The nanocomposites featuring these NGPs exhibit excellent electrical and mechanical properties that cannot be achieved by traditional expanded graphite flake (EGF) composites.

We have overcome the processing difficulty commonly encountered in preparing prior art EGF composites by developing a series of solid blending techniques to combine EGFs (or their much smaller counterparts, NGPs) with a polymer matrix prior to melt processing by using mass production methods such as compression molding. As a result, novel, quite unexpected electrical and mechanical properties were observed with composites containing high EGF proportions. Even more useful and outstanding properties were observed with NGP nanocomposites containing high NGP proportions. These NGP composites exhibit electrical conductivity values that exceed the target bulk conductivity of 100 S/cm or areal conductivity of 200 S/cm$^2$ for composite-based fuel cell bipolar plates as set forth by the US Department of Energy (DOE) and experts in the fuel cells industry. Some NGP-polymer composites exhibit a bulk conductivity higher than an impressive 200 S/cm and NGP reinforced carbon matrix composites (NGP C/C nanocomposites) show a conductivity far above 300 S/cm, which is truly exceptional.

NGP nanocomposites can be used in a wide range of applications, including fuel cell bipolar or flow field plates, battery electrodes, high-performance automotive friction plates, and aircraft landing gear brake drums, etc.

We claim:

1. A nanocomposite material comprising individual, fully separated, nano-scaled graphene platelets dispersed in a matrix material, wherein each of the platelets comprises a sheet of graphite plane or multiple sheets of graphite plane and the platelets have a thickness no greater than 100 nm and an average length, width, or diameter no greater than 500 nm, and wherein the platelets are present in an amount no less than 17% by weight based on the total weight of the platelets and the matrix material combined with a bulk conductivity no less than 10 S/cm or an areal conductivity no less than 200 S/cm$^2$, measured on the basis of a nanocomposite thickness of 1 mm.

2. The nanocomposite as defined in claim 1 wherein said nanocomposite has a bulk conductivity no less than 100 S/cm.

3. The nanocomposite as defined in claim 1 wherein said amount is between 35% and 75% by weight.

4. The nanocomposite as defined in claim 1 wherein said amount is no less than 60% by weight or no less than 45% by volume.

5. The nanocomposite as defined in claim 1 wherein said matrix material comprises a material selected from the group consisting of a polymer, a carbon, a ceramic, a glass, and combinations thereof.

6. The nanocomposite as defined in claim 1 wherein said matrix material comprises a polymer selected from the group consisting of a thermoplastic, a thermoset, a rubber, and combinations thereof.

7. The nanocomposite as defined in claim 1 wherein said platelets have an average length, width, or diameter no greater than 100 nm.

8. The nanocomposite as defined in claim 1 wherein the ratio of the flexural strength of said nanocomposite to the flexural strength of said matrix material is greater than 1.3 and/or the ratio of the flexural modulus of said nanocomposite to the flexural modulus of said matrix material is greater than 2.

9. The nanocomposite as defined in claim 1, which is shaped into a fuel cell bipolar plate, a battery electrode, an automotive friction plate, or an aircraft brake pad.

10. The nanocomposite as defined in claim 1, further comprising a nano-scaled filler selected from the group consisting of a carbon nanotube, carbon nano fiber, carbon black, metal nano-powder, and combinations thereof.

11. A nanocomposite plate comprising individual, fully separated, nano-scaled graphene platelets dispersed in a matrix material, wherein each of the graphene platelets comprises a sheet of graphite plane or multiple sheets of graphite plane and the graphene platelets have a thickness no greater than 100 nm and wherein said graphene platelets are present in an amount between 20% and 75% by weight, and sufficient to make said nanocomposite plate electrically conductive with a thickness-direction conductivity no less than 20 S/cm$^2$ or an areal conductivity no less than 200 S/cm$^2$, measured on the basis of a plate thickness of 1 mm.

12. The nanocomposite plate as defined in claim 11 wherein said plate has a thickness-direction conductivity no less than 100 S/cm.

13. The nanocomposite plate as defined in claim 11 wherein said amount is no less than 45% by weight or no less than 30% by volume.

14. The nanocomposite plate as defined in claim 11 wherein said matrix material comprises a material selected from the group consisting of a polymer, a carbon, a ceramic, a glass, and combinations thereof.

15. The nanocomposite plate as defined in claim 11 wherein said matrix material comprises a polymer selected from the group consisting of a thermoplastic, a thermoset, a rubber, and combinations thereof.

16. The nanocomposite plate as defined in claim 11 wherein said platelets have an average length, width, or diameter no greater than 100 nm.

17. The nanocomposite plate as defined in claim 11, which is used as a fuel cell bipolar plate, a battery electrode, an automotive friction plate, or an aircraft brake pad.

18. The nanocomposite plate as defined in claim 11, further comprising a nano-scaled filler selected from the group consisting of a carbon nanotube, carbon nano fiber, carbon black, metal nano-powder, and combinations thereof.

* * * * *